June 28, 1960 P. A. MEDEARIS 2,942,620
VALVE ACTUATOR
Filed March 7, 1958 3 Sheets-Sheet 1

INVENTOR.
PAUL A. MEDEARIS
BY
ATTORNEY

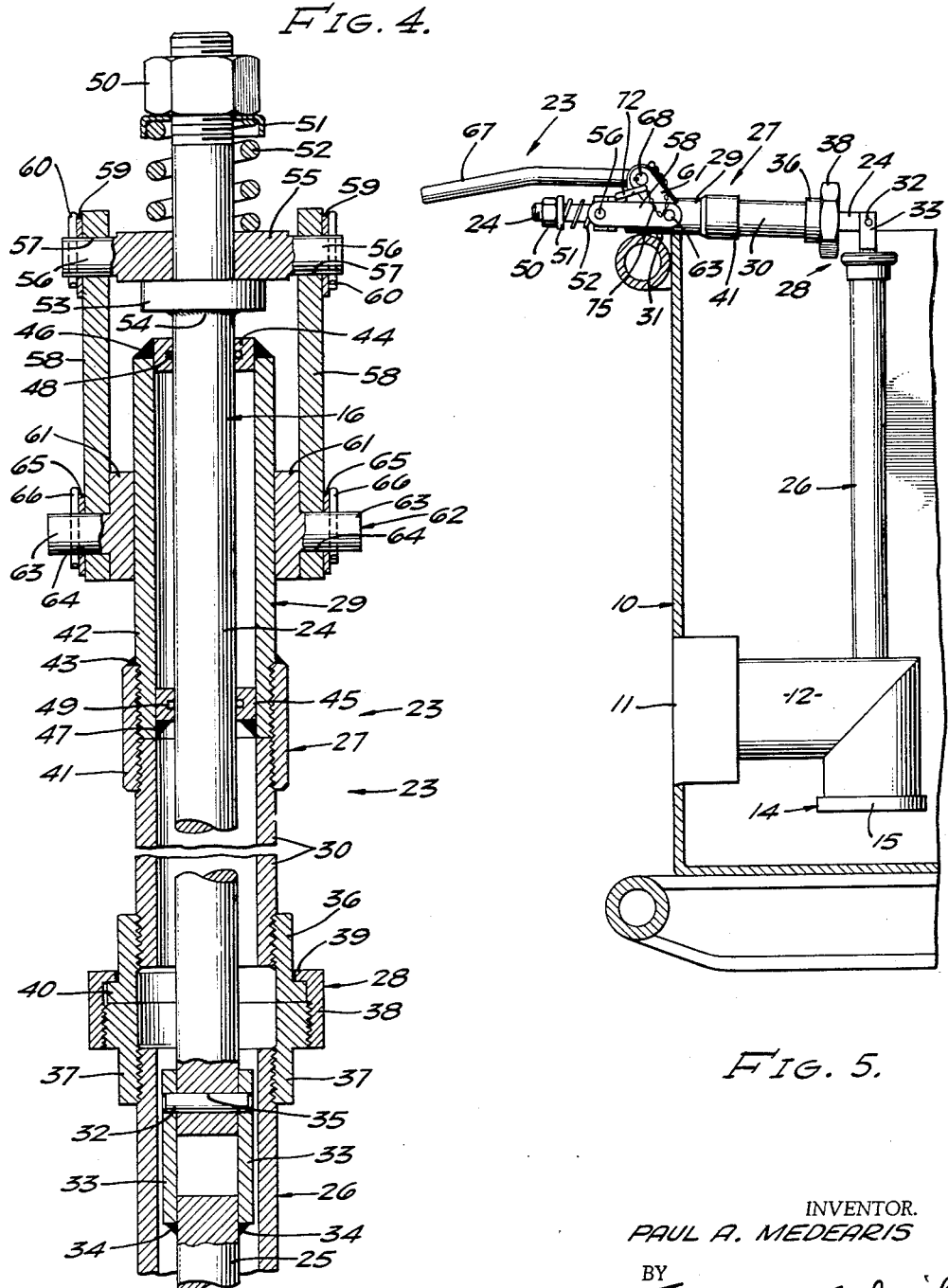

June 28, 1960  P. A. MEDEARIS  2,942,620
VALVE ACTUATOR
Filed March 7, 1958  3 Sheets-Sheet 3
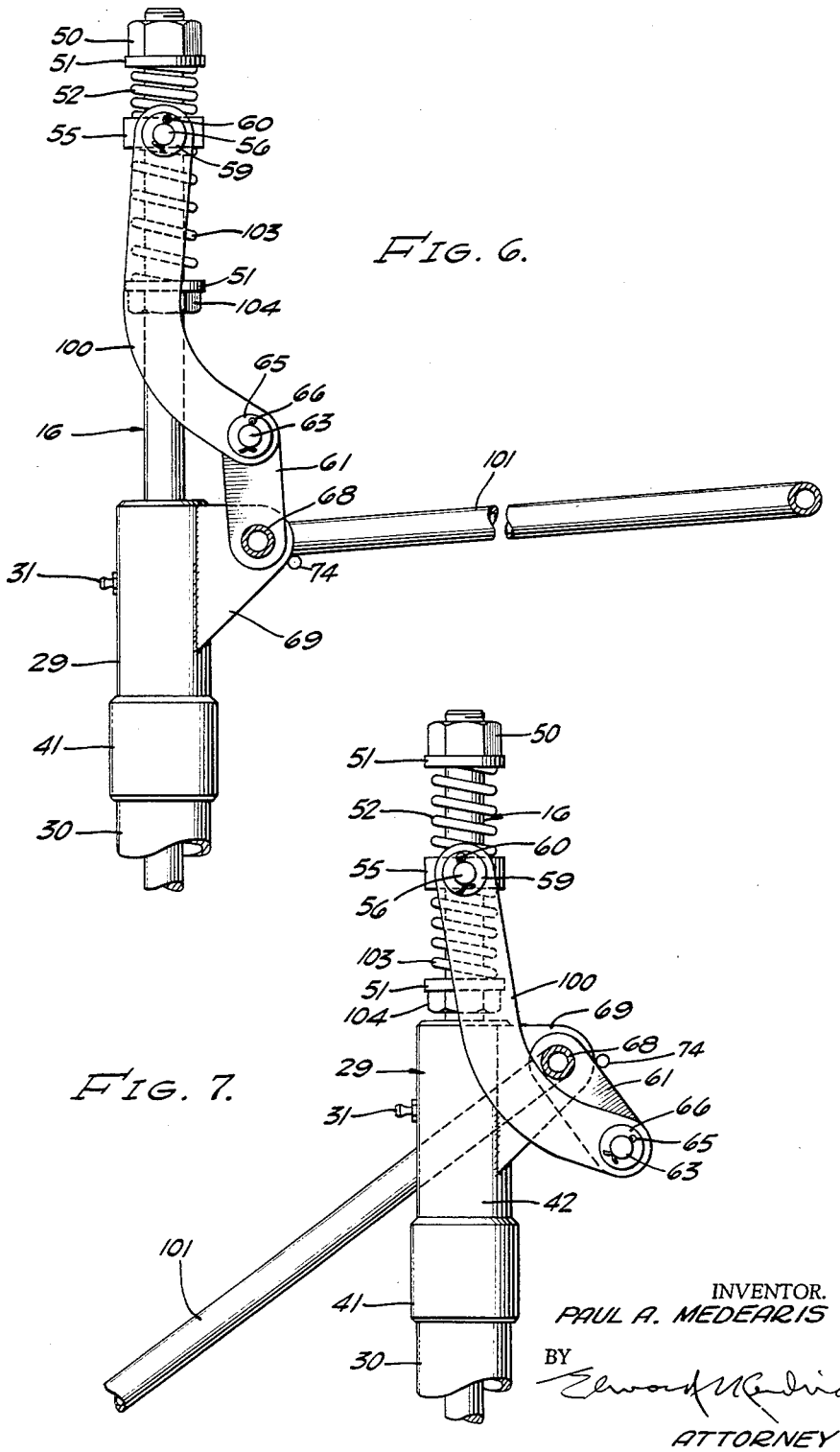
INVENTOR.
PAUL A. MEDEARIS
BY
ATTORNEY

United States Patent Office 2,942,620
Patented June 28, 1960

2,942,620

VALVE ACTUATOR

Paul A. Medearis, 4050 Don Louis Drive,
Los Angeles, Calif.

Filed Mar. 7, 1958, Ser. No. 719,881

4 Claims. (Cl. 137—590)

This invention relates to fluid distribution systems, and more particularly to means for operating valves.

Valves called suction valves are often used at the input conduit to a mud pump for circulating a fluid in an oil well. The conduit extends into a tank which holds the circulation fluid. To the present time, only threaded actuators have been employed to operate such valves.

Threaded valve actuators have several disadvantages. Firstly, it is common practice for such actuators to close valves so tightly that the actuator threads often become stripped and thus increase their maintenance cost. Secondly, these actuators are difficult to lubricate. Thirdly, they are slow and difficult to operate.

The present invention overcomes these and other disadvantages of the prior art by providing a suction valve having operating rod means fixed to it, linkage means for moving the rod means to close the valve, and resilient means to resist yieldingly movement of the linkage means relative to the rod means in a direction to close the valve. Thus, by the use of a reciprocating rod and lever system, the thread stripping disadvantage of the prior art suction valve actuators is obviated. Still further, lubrication of the rod and lever type system is also substantially simplified. The rod and lever system also provides means by which a suction valve may be easily and quickly operated. According to a feature of the invention, a valve actuator is provided including operating rod means for connection with the valve for moving it in a predetermined direction to close it; a framework to guide movement of the rod means; a first follower in a substantially fixed position on the rod means; a second follower slidably mounted around the rod means; resilient means between the followers for resisting movement of the second follower toward the first follower; a handle linkage pivoted from the framework; a free linkage pivoted both from the handle linkage and the second follower, the handle linkage being spaced from the free linkage at an angle less than 180° when the valve is open and at an angle greater than 180° when the valve is closed; and stop means to limit rotation of the handle linkage in a direction to close the valve, the resilient means being in compression when the handle linkage is in contact with the stop means.

The valve is operated by moving the handle linkage. It is moved what is known as "past center." This means it is moved past the position in which both linkages are in line to a position where the handle linkage makes an angle greater than 180° with the free linkage. The stop means, then, prevents further movement of the handle linkage in the same direction. Use of the resilient means forces the handle linkage to bear against the stop means and is normally in compression when the valve is closed. This provides for secure locking action of the valve when it is closed.

It is a feature of the invention that a coiled spring is employed between the two followers where the first follower is a nut threaded to one end of the rod means or operating rod of the valve. Thus, the nut may be loosened, the handle linkage moved to almost close the valve, the nut removed, and the spring replaced with a pipe nipple of substantially the same length. If the handle is left in a position which would normally close the valve, the nut may thereby be tightened down and the valve securely closed without benefit of the spring. This is a desirable feature of the invention whenever a plurality of mud pumps are compounded. This means there will be a back pressure on the valve which is not incurred when pumps are not compounded. In the latter case, the spring is, of course, sufficient to close the valve since the pressure in the input to a mud pump which the valve closes off is lower than that outside of the valve in the circulation fluid tank. The vacuum pressure thus tends to keep the suction valve closed. Whereas when pumps are compounded, the compounding connection tends to open the valve and a spring biased closure will be insufficient to keep the valve closed.

According to an aspect of the invention, a collapsible feature is provided. According to this feature, a valve mechanism is employed including a tank to hold circulation fluid; a conduit having a downwardly extending opening in the tank; a valve to close the opening; a lower pipe fixed to and extending vertically from the conduit; a lower rod fixed to the valve and extending upwardly in the lower pipe to a point above the lower pipe; an upper pipe; coupling means detachably connecting the upper pipe to the lower pipe; an upper rod extending downwardly in the upper pipe; a valve actuator connected to the upper end of the upper rod, the lower end of the upper rod being adjacent to the upper end of the lower rod; and means pivotally connecting the mutually adjacent ends of the rods, the last-named means being above the upper end of the lower pipe at least when the opening is closed by the valve.

It is therefore an object of the invention to provide a valve actuator requiring little or no maintenance.

It is another object of the invention to provide a valve actuator which may be easily and quickly operated.

Still another object of the invention is to provide a valve actuator for securely locking a suction valve in its closed position.

A further object of the invention is to provide a collapsible valve actuator.

These and other objects and advantages of the present invention will be better understood when considered with the following description taken in connection with the accompanying drawings made a part of this specification, wherein several embodiments are illustrated by way of example. The device of the present invention is by no means limited to the specific embodiments illustrated in the drawings since they are shown merely for purposes of description.

Fig. 4 is a further enlarged vertical sectional view of the valve actuator taken on the line 4—4 shown in Fig. 1;

Fig. 5 is a side elevational view of the valve actuator of the invention collapsed for shipping purposes;

Fig. 6 is a side elevational view of an alternative embodiment of the invention shown where the valve is closed; and Fig. 7 is a side elevational view of the valve shown in Fig. 6 with the valve open.

Figure 1:
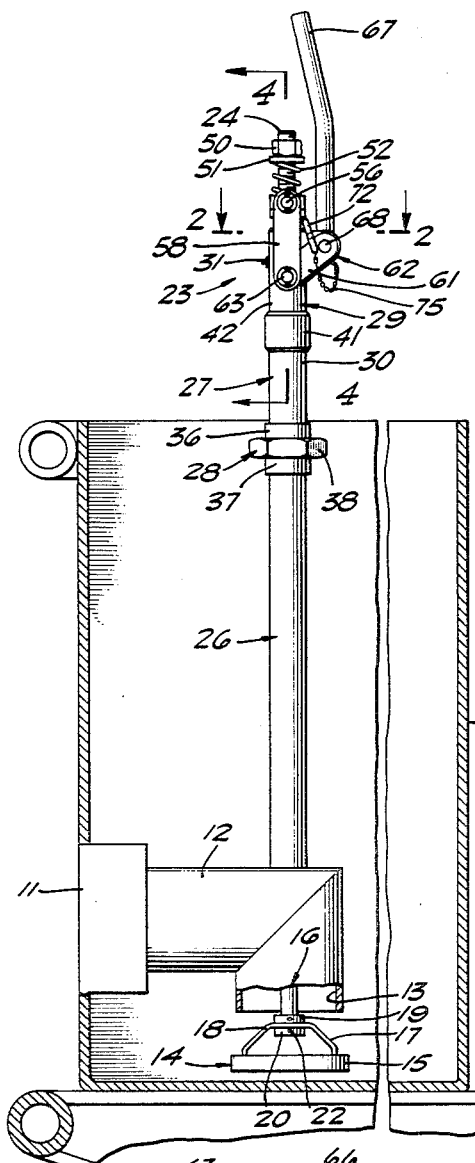
Fig. 1 is a side elevational view of the valve and valve actuator of the invention shown partly in section.

In Fig. 1 a circulation fluid tank is indicated at 10 having an output port 11. Output port 11 is in communication with the interior of the tank 10 by means of a conduit 12 having a downwardly extending opening 13 to provide a seat for a valve 14 which may include any convenient sealing means such as a neoprene ring, not shown, inside of a metal casting 15. Casting 15 is connected to an operating shaft 16 by means of a bent strap of metal 17 connected to casting 15 at its ends. Strap 17 has a hole on its upper side 18 through which shaft 16 projects. Both above and below straps 17, rings 19 and 20 are provided around shaft 16 to maintain strap 17 at a fixed position relative to rod 16 by means of set screws 21 and 22, respectively.

An actuator for the valve 14 is indicated generally at 23. Actuator 23 is connected to valve 14 by means of upper and lower rods 24 and 25 of shaft 16, best shown in Fig. 4. The housing for the actuator includes a lower pipe section 26 connected to an upper pipe section 27 by means of a coupling 28. Upper pipe section 27 includes an upper portion 29 and a lower portion 30.

As shown in Figs. 1, 2, 3 and 5, upper portion 29 of upper pipe section 27 is provided with a grease fitting 31. In Fig. 4, lower rod 25 is pivotally connected with upper rod 24 at a pin 32 which projects through two appendages 33 welded to lower rod 25 at 34. Pin 32 thus projects through a hole 35 in the lower end of upper rod 24. The pivotal connection of rods 24 and 25 must be moved above the pipe coupling 28 for the valve actuator to be collapsed for shipping as shown in Fig. 5. This means the valve 14 will then be approximately closed as indicated in Fig. 5.

In order for the valve actuator 23 to be collapsed as shown in Fig. 5, pipe sections 26 and 27 must, of course, be broken apart. This is provided by means of coupling 28 which includes rings 36 and 37 threaded to the mutually adjacent ends of pipe sections 26 and 27. A cap nut 38 is then threaded to the upper end of ring 37 and has a radially inwardly extending projection 39 to extend over a flange 40 of ring 36. Lower portion 30 of pipe section 27 is simply a nipple which is threaded into a collar 41 on the lower end of upper portion 29 of upper pipe section 27. Collar 41 is threaded onto a nipple 42 and welded thereto at 43. Upper and lower annular rings 44 and 45 are welded to nipple 42 at 46 and 47, and are provided with O-rings 48 and 49, respectively, to retain grease to be packed around upper rod 24 of shaft 16 through grease fitting 31. Rod 24 extends through both rings 44 and 45 outwardly of upper pipe section 27 and has a nut 50 threaded on its upper end with a follower 51 adjacent thereto to receive the upper end of a spring 52 which is coiled around shaft 16. A ring 53 is welded at 54 to shaft 16 and a follower 55 is slidably mounted on rod 24 of shaft 16 between ring 53 and spring 52. Follower 55 has cylindrical projections 56 on opposite sides thereof projecting through apertures 57 in a pair of free linkages 58. The upper ends of linkages 58 are retained on cylindrical projections 56 by means of washers 55 disposed around projections 56 and cotter keys 60 disposed through suitable holes in projections 56 at their respective ends.

Free linkages 58 are rotatably mounted at their other ends from members 61 of handle linkage 62. Members 61 are similarly provided with cylindrical projections 63 which project through holes 65 in free linkages 58. As before, free linkages 58 are retained on projections 63 by means of washers 65 and cotter pins 66 which project through holes in projections 63.

Figure 3:
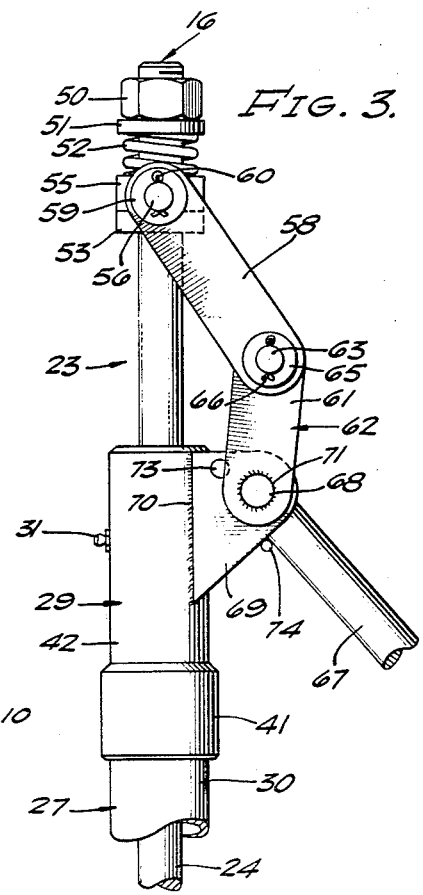
Fig. 3 is a side elevational view of the valve actuator shown in a position to close the valve.
Figure 2:
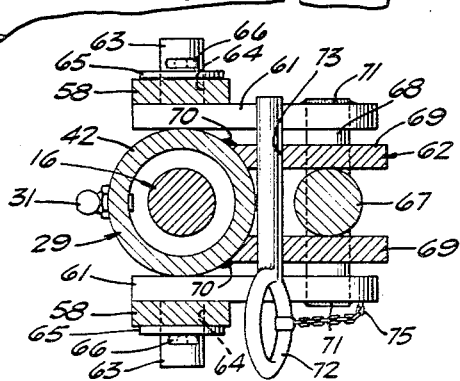
Fig. 2 is a sectional view of the valve actuator taken on the line 2—2 shown in Fig. 1.

As best shown in Figs. 2 and 3, handle linkage 62 comprises a handle 67 fixed to a shaft 68 which is rotatable through a pair of ears 69 welded at 70 to upper portion 29 of upper pipe section 27. Handle linkage 62 also includes members 61 welded to shaft 68 at its ends 71. Valve 14 is maintained open as shown in Fig. 1 with the handle 67 in the vertical position shown in Fig. 1 by means of a cylindrical key 72 which projects through holes 73 in ears 69 to prevent upward movement of members 61 of handle linkage 62. Key 72 is connected to a stop 74 by means of a chain 75 which is welded at one end to stop 74. Stop 74 limits rotational movement of handle 67 to the position shown in Fig. 3. With the handle 67 in the position shown in Fig. 3, the valve 14 is closed, spring 52 is in compression, and free linkage 58 and handle linkage 62 are rotated past "center." This means that they are rotated from the position in which they form an angle less than 180° as shown in Fig. 1 to an angle greater than 180° as shown in Fig. 3 past the point at which the centers of projections 56 and 53 of follower 55 and members 61 lie in line with the center of shaft 68. The fact that free linkages 58 and handle linkage 62 are rotated past "center" means that the action of the spring 24 tending to press the upper end of free linkages 58 straight downwardly and thereby to rotate handle 67 to the right against stop 74 securely maintains the valve in its closed position.

In Figs. 6 and 7, an alternative embodiment of the invention is shown in closed and opened positions, respectively. The actuators shown in Figs. 6 and 7 are different from the actuator shown in Figs. 1 to 5 only by the shape of a free linkage 100, the shape of a handle 101, and the addition of a spring 103 coiled around rod 16 below follower 55. In addition, a follower 104 is fixed to rod 16 below coiled spring 103. The manner in which this embodiment of the invention operates should be evident from its similarity to the embodiment of the invention shown in detail in Fig. 3. Handle 101 is U-shaped to extend around all the linkages. Free linkage 100 is provided with the curvature shown to avoid interference with shaft 68 to which handle 101 is fixed outside of handle linkage 61.

Thus, it is obvious that the embodiment of the invention shown in Figs. 6 and 7 provides the "past center" locking feature of the invention as shown in Figs. 1 to 5 for the valve in both its closed and opened positions. Hence, it is unnecessary to employ locking pin 72 with the embodiment shown in Figs. 6 and 7.

Although only two specific embodiments of the invention have been shown and described, changes and modifications will, of course, suggest themselves to those skilled in the art and the invention is therefore not to be limited to the specific embodiments shown, but is defined only in the appended claims.

I claim:

1. An actuator for a valve comprising: operating rod means for connection with the valve for moving it in a predetermined direction to close it; a framework to guide movement of said rod means; a first follower fixed to said rod means; a second follower slidable on said rod means; a spring coiled around said rod means between said followers; a pair of ears fixed to said framework; shaft means rotatably mounted through said ears; a first linkage fixed to each end of said shaft means outside of each of said ears; a second linkage pivoted from each of said first linkages and pivoted from opposite sides of said second follower; handle means fixed to said first linkages to rotate them simultaneously; stop means to limit movement of said first linkages in a direction to open said valve, said handle linkage and said free linkage being spaced apart at an angle of less than 180° when said valve is open and being spaced apart at an angle greater than 180° when said handle linkage is in engagement with said stop means, said ears being provided with aligned holes above said first linkages when said valve is opened; and a locking pin in the holes in said ears to prevent said valve from closing.

2. A circulation fluid supply assembly comprising: a tank to hold circulation fluid; a conduit having a downwardly extending opening in said tank; a valve to close said opening; a lower pipe fixed to and extending vertically from said conduit; a lower rod fixed to said valve and extending upwardly in said lower pipe to a point above said lower pipe; an upper pipe; coupling means detachably connecting said upper pipe to said lower pipe; an upper rod extending downwardly in said upper pipe; a valve actuator connected to the upper end of said upper rod, the lower end of said upper rod being adjacent to the upper end of said lower rod; and means pivotally connecting the mutually adjacent ends of said rods, said last-named means being above the upper end of said lower pipe at least when said opening is closed by said valve.

3. A circulation fluid supply assembly comprising: a tank to hold circulation fluid; a conduit having a downwardly extending opening in said tank; a valve to close said opening; a lower pipe fixed to and extending vertically from said conduit; a lower rod fixed to said valve and extending upwardly in said lower pipe to a point above said lower pipe; an upper pipe; coupling means detachably connecting said upper pipe to said lower pipe; an upper rod extending downwardly in said upper pipe; a valve actuator connected to the upper end of said upper rod, the lower end of said upper rod being adjacent to the upper end of said lower rod; a pair of appendages fixed to one of said mutually adjacent ends of said rods; and a pin through said appendages and through the other of said mutually adjacent ends of said rods, said upper rod thereby being pivotally connected to said lower rod, said pivotal connection being above the upper end of said lower pipe at least when said valve is lifted to a position closing said opening.

4. An actuator for a valve comprising: operating rod means for connection with the valve for moving it in a predetermined direction to close it; a framework to guide movement of said rod means; a first follower fixed to said rod means; a second follower slidable on said rod means; a spring coiled around said rod means between said followers; a pair of ears fixed to said framework; shaft means rotatably mounted through said ears; a first linkage fixed to each and of said shaft means; a second linkage pivoted from each of said first linkages and pivoted from said second follower; handle means fixed to said first linkages to rotate them simultaneously; stop means to limit movement of said first linkages in a direction to open said valve, said handle linkage and said free linkage being spaced apart at an angle of less than 180° when said valve is open and being spaced apart at an angle greater than 180° when said handle linkage is in engagement with said stop means, said ears being provided with aligned holes above said first linkages when said valve is opened; and a locking pin in the holes in said ears to prevent said valve from closing.

References Cited in the file of this patent

UNITED STATES PATENTS

| | | |
|---|---|---|
| 102,290 | Maxwell | Apr. 26, 1870 |
| 1,380,867 | De Bolotoff | July 7, 1921 |
| 1,526,890 | Wilson | Feb. 17, 1925 |
| 1,606,484 | Shimp | Nov. 9, 1926 |
| 2,166,304 | Laurent | July 18, 1939 |

FOREIGN PATENTS

| | | |
|---|---|---|
| 23,788 | Denmark | Nov. 15, 1918 |

UNITED STATES PATENT OFFICE
CERTIFICATE OF CORRECTION

Patent No. 2,942,620                      June 28, 1960

Paul A. Medearis

It is hereby certified that error appears in the printed specification of the above numbered patent requiring correction and that the said Letters Patent should read as corrected below.

Column 6, line 7, for "each and" read -- each end --.

Signed and sealed this 13th day of December 1960.

(SEAL)
Attest:

KARL H. AXLINE                    ROBERT C. WATSON
Attesting Officer                 Commissioner of Patents